US007076570B2

(12) United States Patent
Ahrens et al.

(10) Patent No.: US 7,076,570 B2
(45) Date of Patent: Jul. 11, 2006

(54) METHOD AND APPARATUS FOR MANAGING SERVICE INDICATOR LIGHTS IN A LOGICALLY PARTITIONED COMPUTER SYSTEM

(75) Inventors: George Henry Ahrens, Pflugerville, TX (US); Curtis Shannon Eide, Rochester, MN (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 10/424,641

(22) Filed: Apr. 25, 2003

(65) Prior Publication Data

US 2004/0212511 A1 Oct. 28, 2004

(51) Int. Cl.
*G06F 3/00* (2006.01)

(52) U.S. Cl. .............................. 710/6; 710/20; 710/33; 710/36; 710/58; 709/200; 711/200; 714/100

(58) Field of Classification Search ................ 710/6, 710/20, 33, 36, 58; 709/200; 711/200; 714/100
See application file for complete search history.

(56) References Cited

U.S. PATENT DOCUMENTS

| 5,194,854 A * | 3/1993 | Havel .................... 340/815.65 |
| 6,101,559 A * | 8/2000 | Schultz et al. ................ 710/15 |
| 6,684,343 B1 * | 1/2004 | Bouchier et al. ............... 714/4 |
| 6,888,800 B1 * | 5/2005 | Johnson et al. ............. 370/247 |
| 2004/0179505 A1 * | 9/2004 | Critz et al. .................. 370/338 |

* cited by examiner

*Primary Examiner*—Kim Huynh
*Assistant Examiner*—Angel L Casiano
(74) *Attorney, Agent, or Firm*—Roy W. Truelson (57) ABSTRACT

A low-level function which enforces logical partitioning establishes a set of virtual indicator lights for certain physical components, the virtual indicator lights being only data in memory, a separate set of virtual indicator lights corresponding to each respective partition. Processes running in a partition can switch and sense the virtual indicator lights corresponding to the partition, but have no direct capability to either switch or to sense the virtual lights of any other partition. The low-level enforcement function alone can switch the state of the physical indicator light, which is generally the logical OR of the virtual indicator lights of the different partitions.

17 Claims, 7 Drawing Sheets

| | P1 | P3 | P4 | HMC | Real |
|---|---|---|---|---|---|
| | | | | | 310 |
| Card1 | | | | | +/- |
| Card2 | | | | | +/- |
| Card3 | | | | | +/- |
| . | | | | | |
| . | | | | | |
| . | | | | | |
| Drawer1 | +/- | +/- | +/- | +/- | +/- |
| Drawer2 | +/- | +/- | +/- | +/- | +/- |
| . | | | | | |
| . | | | | | |
| . | | | | | |

| | Derived |
|---|---|
| Rack1 | +/- |
| Rack2 | +/- |
| . | |
| . | |
| . | |
| Row1 | +/- |
| Row2 | +/- |

METHOD AND APPARATUS FOR MANAGING SERVICE INDICATOR LIGHTS IN A LOGICALLY PARTITIONED COMPUTER SYSTEM

FIELD OF THE INVENTION

The present invention relates to digital data processing, and in particular to the use of indicator lights for identifying different physical components of a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems, each of which may be concurrently performing different functions in a cooperative, although partially autonomous, manner. Typically, the system comprises one or more central processing units (CPUs) which form the heart of the system, and which execute instructions contained in computer programs. Instructions and other data required by the programs executed by the CPUs are stored in memory, which often contains many heterogenous components and is hierarchical in design, containing a base memory or main memory and various caches at one or more levels. At another level, data is also stored in mass storage devices such as rotating disk drives, tape drives, and the like, from which it may be retrieved and loaded into memory. The system also includes hardware necessary to communicate with the outside world, such as input/output controllers; I/O devices attached thereto such as keyboards, monitors, printers, and so forth; and external communication devices for communicating with other digital systems. Internal communications buses and interfaces, which may also comprise many components and be arranged in a hierarchical or other design, provide paths for communicating data among the various system components.

For many reasons, computer systems are usually physically constructed of multiple modular components, each having some pre-defined interface to one or more other components. From the standpoint of the system, a modular component may be viewed as a "black box" which conforms to the pre-defined interface. Any component, regardless of internal structure, which conforms to the same pre-defined interface can be substituted for an existing component in the design of the computer system. This approach enables considerable flexibility in the design and configuration of computer systems. It is possible to improve the design of a computer system by improving the internal design of a modular component (while conforming to the same interface), without affecting other components of the system.

The modularization of computer components may be viewed at any of several levels of generality. At a relatively low level, individual logic gates on a semiconductor chip may be viewed as modular components. Functional units within the chip, such as an adder or an instruction decoder within a processor, are a higher level of modular component. The entire chip itself is also a modular component at still a higher level. This chip is usually mounted on a printed circuit board with other chips, connectors, and discrete components, the printed circuit board assembly being another level of modularity. Multiple circuit boards or other components may be constructed as a functional unit at a still higher level of modularity.

At some level of modularity, the component may be designed to be physically replaceable with an equivalent component after manufacture of the computer system. I.e., the component will be coupled to other components in the system using electrical connectors, clips, threaded fasteners, and the like, which are designed for coupling and uncoupling after manufacture. Such physically replaceable components are referred to as "field replaceable units" (FRUs). A finished electronic circuit board assembly, complete with all components soldered in place, is often designed as such a FRU, while an integrated circuit chip typically is not. The use of such field replaceable units facilitates the replacement of a defective component with a new component of identical type after system manufacture. It also facilitates the re-configuration or upgrade of an existing physical computer system by substituting a newer or enhanced version of a FRU for the existing unit. Additionally, a computer system may be constructed with unused couplings, which provide support for later upgrading the computer system by attaching additional FRUs to the unused couplings. The use of multiple types of FRUs attached to generic couplings enables a basic computer system design to be configured in any one of a very large number of configuration permutations.

A complex computer system may contain a large number of FRUs of a given type, which are difficult to visually distinguish. For example, electronic logic circuitry is typically contained in multiple circuit card assemblies (a type of FRU), which are plugged into some form of card frame assembly (another type of FRU), which in turn may be housed in larger racks or similar units (another type of FRU). Physically, the racks look pretty much alike, the card frame assemblies look pretty much alike, and even many of the cards can look pretty much alike. A trained eye can generally tell the difference between a processor card (i.e., a card mounting one or more processor units) and a memory card (a card mounting banks of memory modules), but all processor cards may look alike and all memory cards may look alike. There may, in fact, be no physical difference whatsoever between two units, the only difference being logical assignments (such as addresses or identifiers) made by the computer system to distinguish one unit from another.

For maintenance and other purposes, it is often desirable to know which physical unit corresponds to a logical designation made by the computer system. For example, the internal diagnostics of a computer system may detect a defect in a memory card having a particular address range. However, this address range is simply a logical assignment of the computer system. In order to replace the defective memory card, one must determine which physical card corresponds to the address range at which the defect exists. The physical memory card is simply one of multiple cards, which appear identical. If there are a large number of such cards, it can be difficult to determine which card is the one corresponding to the address range in question. It will be understood that replacement of a unit is only one example of a situation in which it is desirable to identify the unit, there being many other such circumstances which do not involve replacement of the unit.

One technique for assisting the service person in this instance is to provide switchable indicator lights on the various units. Indicator lights often correspond to physical FRU's, but may be used for other physical components. For example, separate indicator lights may be associated with different physical ports or connectors of a single FRU. The lights are activated under control of the computer system itself. If a person wishes to know the physical location of a particular unit, he can command the computer to light up the indicator light of the unit corresponding to some logical designator (such as a memory address, in the case of a memory card). The system responds by switching on the indicator light, showing the person the corresponding physical unit. Where a large system is housed in a hierarchy of devices, such as cards in card frames, which are in turn in larger racks, the system can light up not only the card, but the card frame in which the card is located, and the rack in which the card frame is located, for easier determination of the card location.

Another recent development in the management of complex computer system resources is the logical partitioning of system resources. Conceptually, logical partitioning means that multiple discrete partitions are established, and the system resources of certain types are assigned to respective partitions. For example, processor resources of a multi-processor system may be partitioned by assigning different processors to different partitions, by sharing processors among some partitions and not others, by specifying the amount of processing resource measure available to each partition which is sharing a set of processors, and so forth. Tasks executing within a logical partition can use only the resources assigned to that partition, and not resources assigned to other partitions. Memory resources may be partitioned by defining memory address ranges for each respective logical partition, these address ranges not necessarily coinciding with physical memory devices.

Logical partitions are generally defined and allocated by a system administrator or user with similar authority. I.e., the allocation is performed by issuing commands to appropriate management software resident on the system, rather than by physical reconfiguration of hardware components. It is expected, and indeed one of the benefits of logical partitioning is, that the authorized user can re-allocate system resources in response to changing needs or improved understanding of system performance. Some logical partitioning systems support dynamic partitioning, i.e., the changing of certain resource definition parameters while the system is operational, without the need to shut down the system and re-initialize it.

Where a logically partitioned computer system utilizes lighted indicators for assisting maintenance personnel, it is often desirable to permit at least some tasks running in each partition to light up the indicator lights applicable to hardware used by that partition. Since multiple logical partitions may actually share the same physical hardware unit, this would mean that multiple tasks running in different partitions have authority to light up the same indicator light. This could create confusion among partitions and users regarding the state of indicator lights and authority to switch indicators.

Although not necessarily generally recognized, this situation further creates a potential security exposure. Generally, logical partitions act like separate computer systems, and any communication between processes executing in different partitions should pass through some defined channel. Systems may run under different security constraints, be accessible by different sets of users, and so forth. Indeed, one of the advantages of logical partitioning is to permit the same physical system to support different operating environments for different user needs. If multiple partitions having access to an indicator light can both switch the light on and off, and sense other partitions doing so, then a covert communications channel exists from one partition to the next, which is not necessarily monitored by any controlling operating system function. It is conceivably possible to communicate serial data back and forth by switching and sensing indicator lights shared by more than one partition.

There exists a need for a technique which will give processes in different logical partitions needed control over the relevant indicator lights, without creating covert communications channels or interfering with other essential functions.

SUMMARY OF THE INVENTION

A low-level function which enforces logical partitioning establishes a set of virtual indicator lights for certain physical components, the virtual indicator lights being only data in memory, a separate set of virtual indicator lights corresponding to each respective partition. Processes running in a partition can switch and sense the virtual indicator lights corresponding to the partition, but have no direct capability to either switch or to sense the virtual lights of any other partition. The low-level enforcement function alone can switch the state of the physical indicator light, which is generally the logical OR of the virtual indicator lights of the different partitions.

Because the logical partitioning enforcement function controls the actual physical indicator lights, a certain consistency in behavior is enforced, although the behavior of a physical light is not always identical to the behavior of the virtual light. Moreover, because each partition can see only its respective virtual lights, it is not possible for one partition to communicate with another by these means, and a covert communications channel is avoided.

In the preferred embodiment, each physical indicator light is associated with a physical device in a hierarchy of physical devices, such as an electronic circuit card assembly ("card"), a card frame unit holding multiple cards ("drawer"), a rack holding multiple card frame units, or a set ("row") of racks. Virtual indicator lights are associated only with card frame units (drawers). The state of physical lights for racks or rows of racks is not directly set by software processes, but is derived from the state of indicator lights for the cards or card frames. However, indicator lights could alternatively be used for other types of physical components, the components need not be FRUs, and/or all indicator lights could be directly set.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Logical Partitioning Overview

Logical partitioning is a technique for dividing a single large computer system into multiple partitions, each of which behaves in some respects as a separate computer system. Certain resources of the system may be allocated into discrete sets, such that there is no sharing of a single resource among different partitions, while other resources may be shared on a time interleaved or other basis. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources assigned to that partition, and not resources assigned to other partitions.

Logical partitioning is indeed logical rather than physical. A general purpose computer typically has physical data connections such as buses running between a resource in one partition and one in a different partition, and from a physical configuration standpoint, there is typically no distinction made with regard to logical partitions. Generally, logical partitioning is enforced by low-level encoded data, which is referred to as "licensed internal code", although there may be a certain amount of hardware support for logical partitioning, such as hardware registers which hold state information. The system's physical devices and subcomponents thereof are typically physically connected to allow communication without regard to logical partitions, and from this standpoint, there is nothing which prevents a task executing in partition A from writing to memory or an I/O device in partition B. Low level licensed internal code function and/or hardware prevent access to the resources in other partitions.

Code enforcement of logical partitioning constraints means that it is possible to alter the logical configuration of a logically partitioned computer system, i.e., to change the number of logical partitions or re-assign resources to different partitions, without reconfiguring hardware. Generally, a logical partition management tool which interfaces with low-level code function that enforces logical partitioning is provided for this purpose. This management tool is intended for use by a single or a small group of authorized users, who are herein designated the system administrator. In the preferred embodiment described herein, this low-level logical partitioning code is referred to as the "hypervisor", and the management tool is referred to as the "hardware management console".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. Finally, it makes it possible for a single computer system to concurrently support multiple operating systems and/or environments, since each logical partition can be executing a different operating system or environment.

Additional background information regarding logical partitioning can be found in the following commonly owned patents and patent applications, which are herein incorporated by reference: Ser. No. 09/838,057, filed Apr. 19, 2001, entitled *Method and Apparatus for Allocating Processor Resources in a Logically Partitioned Computer System*; Ser. No. 09/836,687, filed Apr. 17, 2001, entitled *A Method for Processing PCI Interrupt Signals in a Logically Partitioned Guest Operating System*; Ser. No. 09/836,692, filed Apr. 17, 2001, entitled *A Method for PCI Bus Detection in a Logically Partitioned System*; Ser. No. 09/836,139, filed Apr. 17, 2001, entitled *Method for PCI I/O Using PCI Device Memory Mapping in a Logically Partitioned System*; Ser. No. 09/672,043, filed Sep. 29, 2000, entitled *Technique for Configuring Processors in System With Logical Partitions*; U.S. Pat. No. 6,438,671 to Doing et al.; U.S. Pat. No. 6,467,007 to Armstrong et al.; Ser. No. 09/314,541, filed May 19, 1999, entitled *Apparatus and Method for Specifying Maximum Interactive Performance in a Logical Partition of a Computer*; Ser. No. 09/314,324, filed May 19, 1999, entitled *Management of a Concurrent Use License in a Logically Partitioned Computer*; Ser. No. 09/314,214, filed May 19, 1999, entitled *Logical Partition Manager and Method*; U.S. Pat. No. 6,279,046 to Armstrong et al.; U.S. Pat. No. 5,659,786 to George et al.; and U.S. Pat. No. 4,843,541 to Bean et al. The latter two patents describe implementations using the IBM S/360, S/370, S/390 and related architectures, while the remaining applications describe implementations using the IBM AS/400 and related architectures.

Detailed Description

Figure 1:
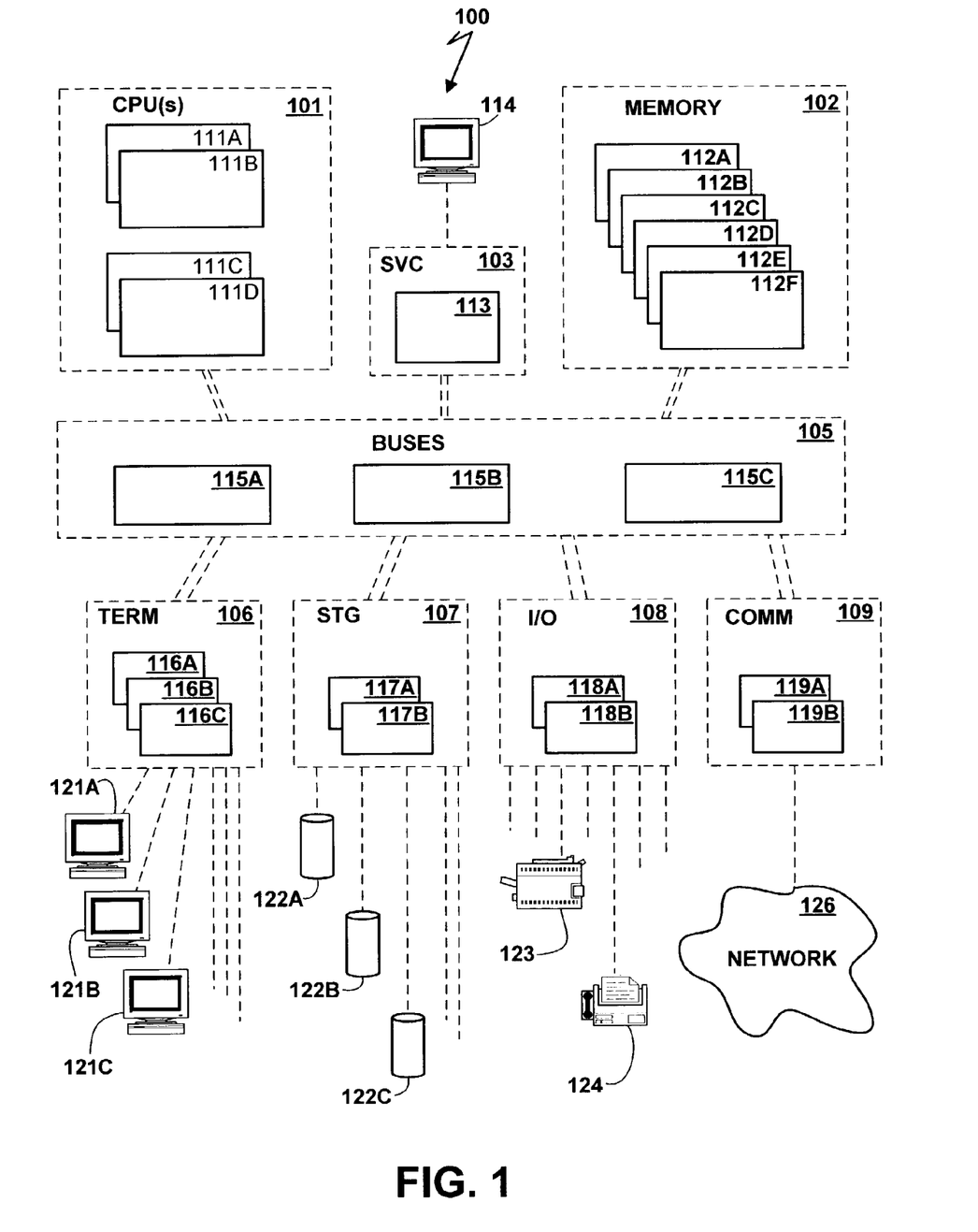
FIG. 1 is a high-level block diagram of the major hardware components of a logically partitionable computer system having multiple physical hardware components, according to the preferred embodiment of the present invention.

Referring to the Drawing, wherein like numbers denote like parts throughout the several views, FIG. 1 is a high-level representation of the major hardware components of a logically partitionable computer system 100 having multiple physical hardware components, according to the preferred embodiment of the present invention. At a functional level, the major components of system 100 are shown in FIG. 1 outlined in dashed lines; these components include one or more central processing units (CPU) 101, main memory 102, service processor 103, terminal interface 106, storage interface 107, I/O device interface 108, and communications/network interfaces 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Typically, a logically partitioned system will contain multiple CPUs. Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Service processor 103 is a special-purpose functional unit used for initializing the system, maintenance, and other low-level functions. In general, it does not execute user application programs, as does CPU 101. In the preferred embodiment, among other functions, service processor 103 and attached hardware management console (HMC) 114 provide an interface for a system administrator or similar individual, allowing that person to manage logical partitioning of system 100, as described more fully herein. However, the interface to logical partitioning control (the "hypervisor") could be performed by other system components, and system 100 need not necessarily have a dedicated service processor and hardware management console.

Terminal interface 106 provides a connection for the attachment of one or more user terminals 121A–C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A–C, (referred to generally as 122), which are preferably rotating magnetic hard disk drive units, although other types of data storage device could be used. I/O and other device interface 108 provides an interface to any of various other input/output devices or devices of other types. Two such devices, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information. In the preferred embodiment, in addition to various high-speed data buses used for communication of data as part of normal data processing operations, a special service bus using an I2C protocol connects the various hardware units, allowing the service processor or other low-level processes to perform various functions independently of the high-speed data buses, such as powering on and off, reading hardware unit identifying data, and so forth. In particular, this service bus is used for switching indicator lights in the preferred embodiment. However, such a service bus is not necessarily required.

Physically, the major functional units are typically constructed from one or more field replaceable units. Often, such a field replaceable unit is an electronic circuit card assembly. However, a physical unit need not be an electronic circuit card assembly. It could alternatively be a component such as a disk drive storage device 122, a terminal 121, a power supply, and so forth. Additionally, a single physical unit may have one or more FRUs within itself. For larger systems, a single major functional component, such as CPU 101 or memory 102, will often comprise multiple field replaceable units in the form of electronic circuit card assemblies, although it is alternatively possible for more than one major functional component to reside in a single FRU. In FIG. 1, CPU 101 is represented as containing four circuit cards (FRUs) 111A–D, each of which may contain one or more processors; memory 102 is represented as containing six cards 112A–112F, service processor 103 as containing a single card 113, buses 105 as containing three cards 115A–C, terminal interface 106 as containing three cards 116A–116C, storage interface 107 as containing two cards 117A–B, I/O and other interface 108 as containing two cards 118A–B, and communications interface 109 as containing two cards 119A–B.

It should be understood that FIG. 1 is intended to depict the representative major components of an exemplary system 100 at a high level, that individual components may have greater complexity than represented FIG. 1, and that the number, type and configuration of such functional units and physical units may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients).

In the preferred embodiment, indicator lights are associated with a hierarchy of physical hardware components, which for simplicity of illustration and description are herein designated rows, racks, drawers and cards. The hierarchy expresses a containment relationship, i.e., a row contains one or more racks, a rack contains one or more drawers, and a drawer contains one or more cards.

Figure 2:
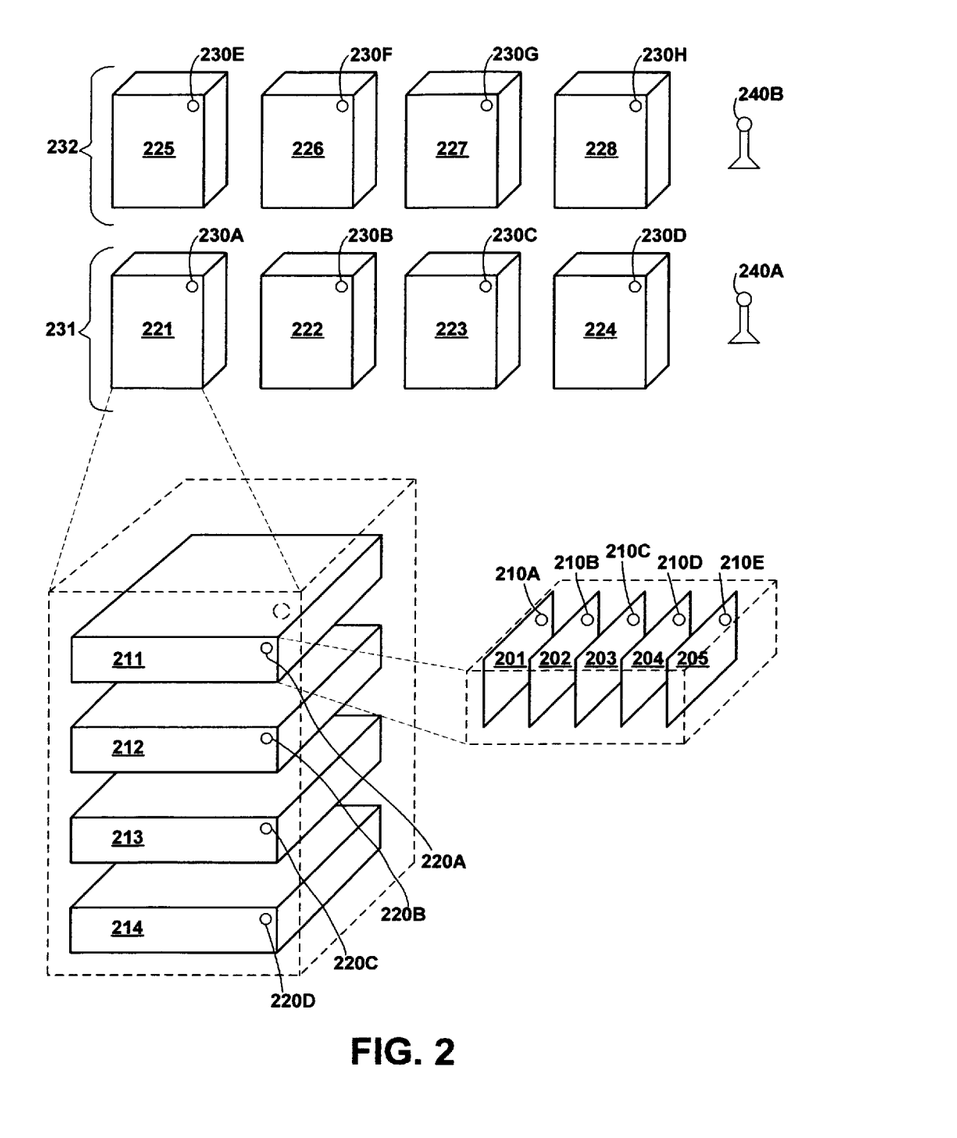
FIG. 2 is a simplified representation of a hierarchy of physical units and indicator lights in the computer system of the preferred embodiment.

FIG. 2 is a simplified representation of the hierarchy of physical units and indicator lights in computer system 100, according to the preferred embodiment. As shown in FIG. 2, the lowest level of physical unit for which indicator lights are associated is an electronic circuit card 201–205. Although "cards" are shown in FIG. 2 and described in the illustrative embodiment herein, it should be understood that a hardware unit at the lowest level of the hierarchy could be something other than a card. For example, it could be a connector or port on a card (so that a single card having multiple ports might contain multiple indicator lights, one for each port). Such a hardware unit might alternatively be a rotating disk drive storage unit, or some other hardware component. Multiple cards 201–205 are housed in a single card frame assembly 211, which is referred to herein as a "drawer". Multiple drawers 211–214 are housed in a single "rack" 221. In the preferred embodiment, a rack is a large freestanding cabinet housing multiple drawers and auxiliary components, such as power distribution and cooling systems. The drawer is a physical drawer which can be pulled out of the rack for access. Multiple racks 221–228 can be arranged in sets of racks, herein referred to as rows 231–232. In the representation of FIG. 2, two rows 231–232 are shown, racks 221–224 corresponding to row 231, and racks 225–228 corresponding to row 232. It should be understood that the hierarchy of physical units according to the preferred embodiment is simply one physical packaging design implementation for a large computer system, that the number of levels of hierarchical hardware components may vary as well as the design of individual hardware components, and many other variations are possible.

Each row has a respective indicator light 240A–B, each rack has a respective indicator light 230A–H, and each drawer a respective indicator light 220A–D. Some, but not all, cards have respective indicator lights 210A–E. The use of indicator lights in a hierarchy associated with a hierarchy of physical packaging allows one to easily determine the location of a particular physical unit at the lowest level, i.e., a card. Cards may not be visible when the drawer is fully closed in the rack. To identify a particular card, the row, rack and drawer containing the card are lighted. A person may then follow the chain of indicator lights to the correct drawer, open the drawer, and find the correct card (which, if it has an indicator light, should also be lit up). Although the particular hierarchy of row, rack, drawer and card is used in the preferred embodiment, it will be understood that one could alternatively light up other components or fewer than all of these components, and that lights need not be associated with FRUs. For example, indicator lights could be associated with different physical ports of a communications adapter card.

Figure 3:
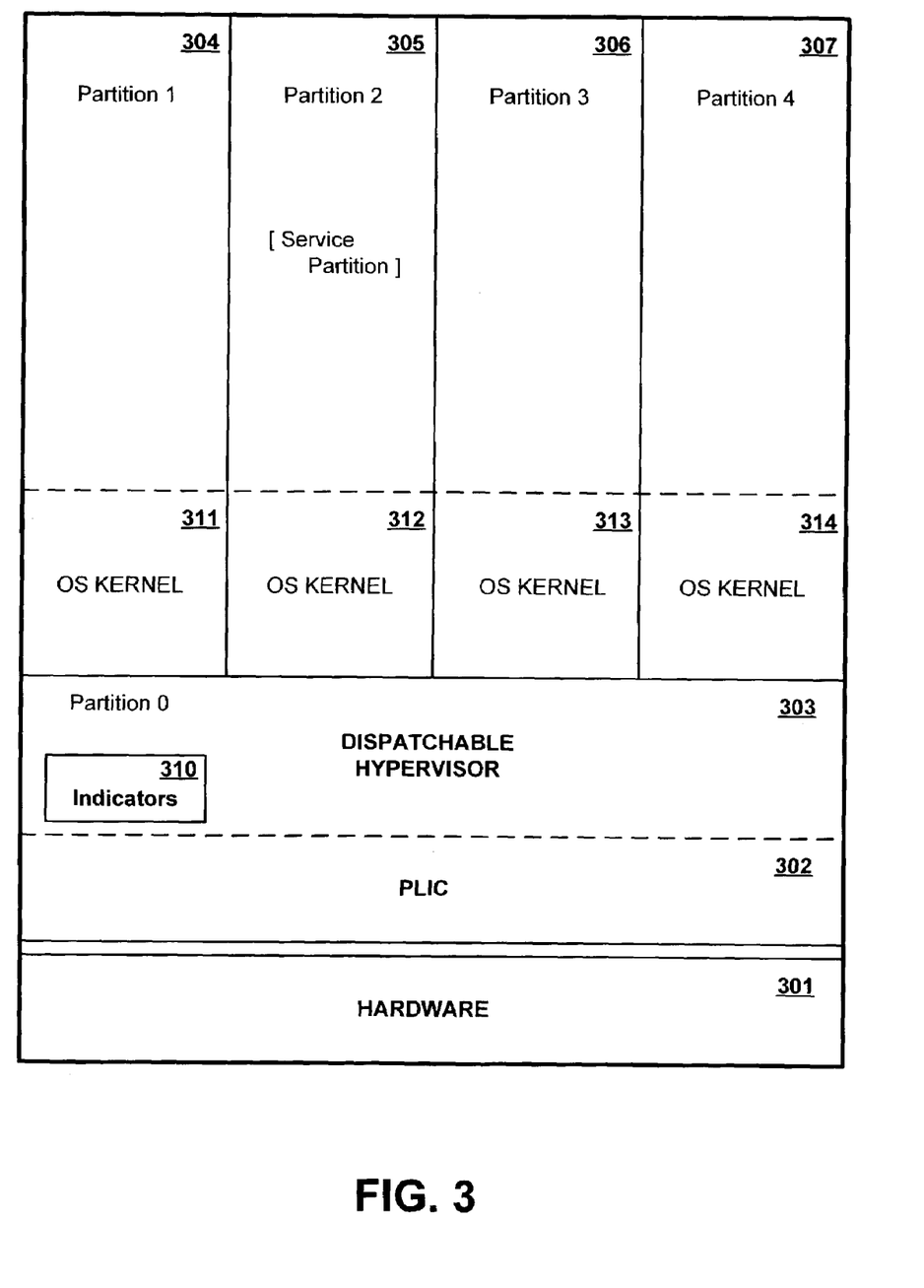
FIG. 3 is a conceptual illustration showing the existence of logical partitions at different hardware and software levels of abstraction in a computer system, according to the preferred embodiment.

FIG. 3 is a conceptual illustration showing the existence of logical partitions at different hardware and software levels of abstraction in computer system 100. FIG. 3 represents a system having four logical partitions 304–307 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 3, the "higher" levels of abstraction are represented toward the top of the figure, while lower levels are represented toward the bottom.

As shown in FIG. 3 and explained earlier, logical partitioning is a code-enforced concept. At the hardware level 301, logical partitioning does not exist. As used herein, hardware level 301 represents the collection of physical devices (as opposed to data stored in devices), such as processors, memory, buses, I/O devices, etc., shown in FIGS. 1 and 2, possibly including other hardware not shown in FIGS. 1 and 2. As far as a processor of CPU 101 is concerned, it is merely executing machine language instructions. In the preferred embodiment, each processor is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 3 as a single entity 301, which does not itself distinguish among logical partitions.

Immediately above the hardware is a common low-level hypervisor base, consisting of a non-relocatable portion 302, referred to as partitioning licensed internal code (PLIC), and a relocatable portion 303, referred to as the dispatchable hypervisor. Collectively, levels 302 and 303 are called simply the "hypervisor". Together, PLIC 302 and dispatchable hypervisor 303 enforce logical partitioning. The hypervisor is super-privileged code which is capable of accessing resources, and specifically processor resources and memory, in any partition. The hypervisor causes state values to be written to various hardware registers and other structures, which define the boundaries and behavior of the logical partitions. As represented in FIG. 3, there is no direct path between higher levels (levels above dispatchable hypervisor 303) and hardware level 301, meaning that commands or instructions generated at higher levels must pass through dispatchable hypervisor 303 and/or PLIC 302 before execution on the hardware. Hypervisor 302, 303 enforces logical partitioning of processor resources by presenting a partitioned view of hardware to the task dispatchers at higher levels. I.e., task dispatchers at a higher level (the respective operating systems) dispatch tasks to virtual processors defined by the logical partitioning parameters, and the hypervisor in turn dispatches virtual processors to physical processors at the hardware level 301 for execution of the underlying task. The hypervisor also enforces partitioning of other resources, such as allocations of memory to partitions, and routing I/O to I/O devices associated with the proper partition. Hypervisor 302, 303 contains state data, some of which may be stored in special purpose registers while other such state data is stored in tables or other structures. Essentially, this state data defines the allocation of resources in logical partitions, and the allocation is altered by changing the state data rather than by physical reconfiguration of hardware.

Above dispatchable hypervisor 303 is another level of machine management code herein identified as the "OS kernel" 311–314. At the level of the OS kernel, each partition behaves differently, and therefore FIG. 3 represents the OS Kernel as four different entities 311–314 corresponding to the four different partitions. In general, each OS kernel 311–314 performs roughly equivalent functions. However, it is not necessarily true that all OS kernels 311–314 are identical copies of one another, and they could be different versions of architecturally equivalent operating systems, or could even be architecturally different operating system modules. OS kernels 311–314 perform a variety of task management functions, such as task dispatching, paging, enforcing data integrity and security among multiple tasks, and so forth.

Above the OS kernels in each respective partition there may be a set of high-level operating system functions, and user application code and data (not shown). A user may create code above the level of the OS Kernel, which invokes high level operating system functions to access the OS kernel, or may directly access the OS kernel. In the IBM i/Series™ architecture, a user-accessible architecturally fixed "machine interface" forms the upper boundary of the OS kernel, (the OS kernel being referred to as "SLIC"), but it should be understood that different operating system architectures may define this interface differently, and that it would be possible to operate different operating systems on a common hardware platform using logical partitioning.

In the preferred embodiment, the lowest level of the hypervisor, the PLIC 302, is non-relocatable, meaning that the code which constitutes PLIC is at a fixed hardware address in memory. PLIC 302 has access to the entire real memory range of system 100, and can manipulate real memory addresses. The dispatchable hypervisor code 303 (as well as all partitions above it) is contained at addresses which are relative to a logical partitioning assignment, and therefore this code is relocatable. The logical partition of the dispatchable hypervisor is designated "Partition 0". This partition is used only for the dispatchable hypervisor, and is not available for user applications and data. In general, PLIC 302 handles assignment of tasks to physical processors, memory enforcement, and similar essential partitioning tasks required to execute application code in a partitioned system, while dispatchable hypervisor handles maintenance-oriented tasks, such as creating and altering partition definitions. In particular, dispatchable hypervisor 303 includes a state table of visual indicators 310 which, in conjunction with dispatchable hypervisor code, is used to activate and deactivate physical indicator lights, as described in greater detail herein A special user interactive interface is provided into dispatchable hypervisor 303, for use by a system administrator, service personnel, or similar privileged users. This user interface can take different forms, and is referred to generically as the Service Focal Point (SFP). In the preferred embodiment, i.e., where system 100 contains a service processor 103 and attached hardware management console 114, the HMC 114 functions as the Service Focal Point application for the dispatchable hypervisor. In the description herein, it is assumed that HMC 114 provides the interface for the hypervisor.

One and only one of the logical partitions is designated the service partition. In FIG. 3, partition 305 is designated a service partition. The service partition is the partition assigned for use by system maintenance personnel to perform various administrative and maintenance functions. The service partition may be used exclusively for administrative and maintenance functions, or it may also be used for user applications. However, where system 100 contains a hardware management console 114 as shown in the preferred embodiment, most of the service and maintenance functions are performed from the hardware management console rather than the service partition. Where system 100 contains no hardware management console, the service partition is capable of performing a subset of the functions supported on the hardware management console.

While various details regarding a logical partitioning architecture have been described herein as used in the preferred embodiment, it will be understood that many variations in the mechanisms used to enforce and maintain logical partitioning are possible consistent with the present invention, and in particular that administrative mechanisms such as a service partition, service processor, hardware management console, dispatchable hypervisor, and so forth, may vary in their design, or that some systems may employ some or none of these mechanisms, or that alternative mechanisms for supporting and maintaining logical partitioning may be present.

Figure 4:
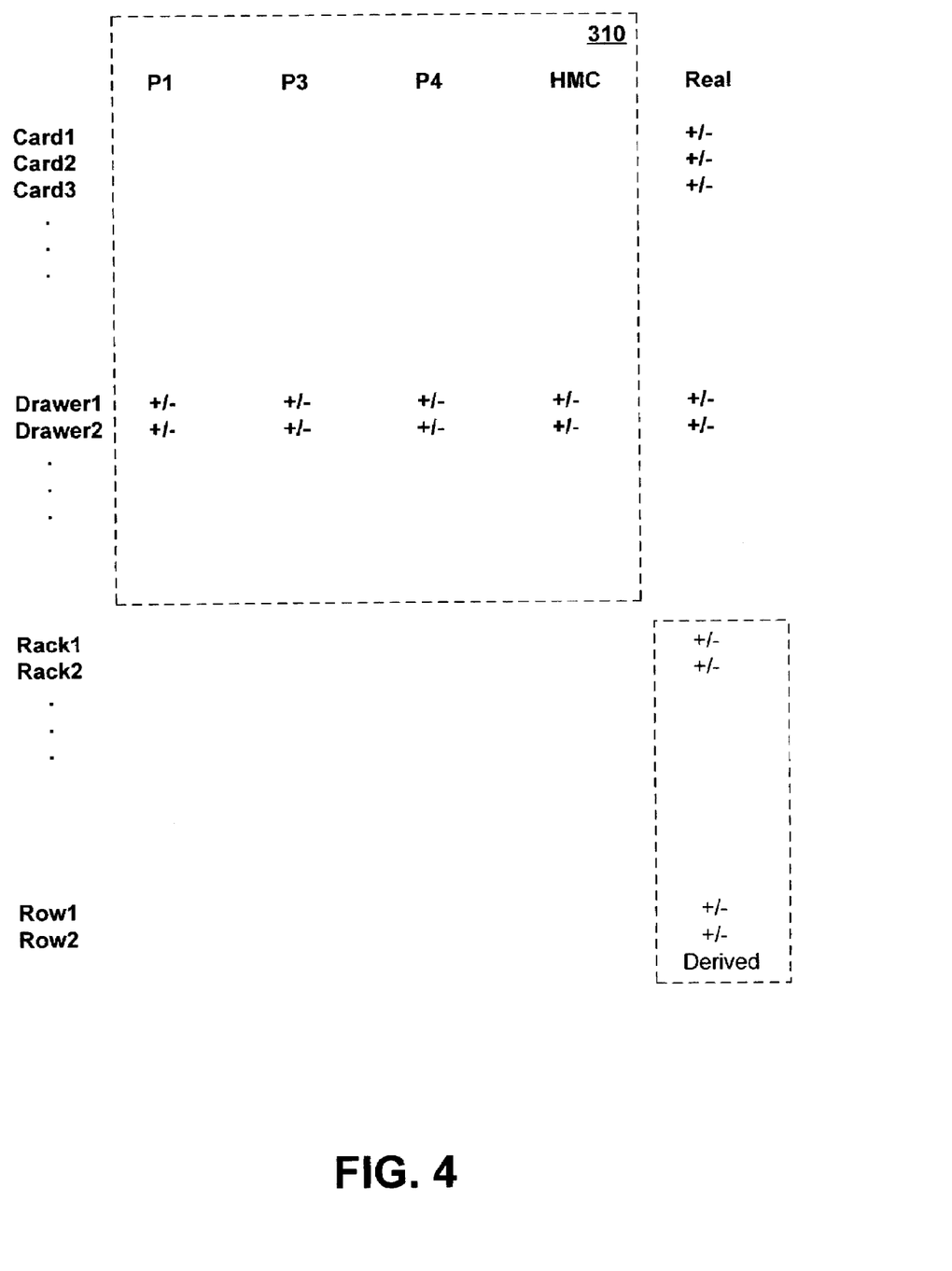
FIG. 4 is a simplified representation of an virtual and real indicator light states managed by the hypervisor, according to the preferred embodiment.

FIG. 4 is a simplified representation of virtual and real indicator light states managed by the hypervisor, according to the preferred embodiment. Referring to FIG. 4, each row represents a single indicator light, there being lights associated with cards, drawers, racks and rows, which are not all treated identically. A separate column is assigned to each respective partition and represents the virtual view of drawer indicator light state which is viewable and settable by the respective partition (not including partition 0, which is the dispatchable hypervisor itself, and not including the service partition). An additional separate column represents drawer indicator settings made under the control of the process executing in the hardware management console, or a process in the service partition; indicators in this column (one for each drawer) are herein designated "HMC indicators" for brevity, it being understood that they are not necessarily set by an HMC process. Finally, a last column, designated "real", represents the actual physical state of the corresponding indicator light. In the preferred embodiment, each light, whether virtual or real, has only two possible states, which is represented as "+/−" in FIG. 4. Preferably, the lights flash when in one state and are off in the other state. However, one could alternatively have more than two states (such as a "continuous on", a "flashing", and an "off" state).

In the preferred embodiment, the hypervisor maintains a virtual state table 310 for drawer indicator lights. The virtual indicator lights are simply data in table 310, and are not necessarily the same as the state of the real drawer indicator light. Virtual drawer indicator lights can be set or read by processes executing within the respective user partitions (other than the service partition); these processes can not access virtual indicators of other partitions, or the real indicators. The state of a rack or row indicator light is always derived from the states of its components. I.e., the state of a rack indicator light is the logical OR of the states of the indicator lights for all drawers within the rack, and the state of a row indicator light is the logical OR of the states of the indicator lights for all racks within the row. The row and rack lights are lit automatically by the hardware based on the current state of cards and drawers. This is represented in FIG. 4 by the dashed line box, which shows that these state elements are not in fact part of table 310 or directly set by the hypervisor, but are illustrated in FIG. 4 only for completeness of representation.

As shown in FIG. 4, each partition has a virtual view of the indicator lights associated with drawers. A partition can independently set or read its virtual indicators. A partition has no capability to set or read the virtual indicators associated with a different partition. In the preferred embodiment, a partition has a virtual indicator associated with a drawer only if the partition accesses some resource associated with that drawer, e.g., if one of the cards assigned to the partition is physically located within the drawer. A partition which does not use any resources within a given drawer does not have a virtual indicator associated with that particular drawer, on the theory that there would be little reason for the partition to light up that drawer. It will be understood that varying rules could be used to determine whether a partition's relationship to a particular drawer is sufficient to warrant a virtual indicator assigned to that combination of partition and drawer, and that it would be possible alternatively to simply assign a virtual indicator to each and every combinations of partition and drawer.

In addition, each partition may have the capability to set or read real indicators associated with certain hardware components assigned to the respective partition as a resource. In the preferred embodiment, only indicators on cards which are not shared among different partitions (e.g., PCI bus adapter cards) are capable of being set or read by a logical partition. For this reason, the partition to which the card is assigned can directly set or read the real indicator for the card, and no virtual indicator is necessary. However, it would alternatively be possible to maintain virtual indicators for cards which are shared resources, in the same manner as virtual indicators are maintained for drawers.

The hardware management console 114 has the authority to directly turn indicator lights on and off, i.e., can view the state of real indicator lights. However, an additional state variable, represented as the HMC column, is needed for recording HMC actions for drawer lights only. The reason for this is that, if independent actions from the HMC and a user partition caused a drawer light to be switched on, it is desirable to record that fact so that the light will be switched off only after the HMC switches off the drawer light, as explained more fully herein.

In accordance with the preferred embodiment, each user partition has a virtual view of the indicator lights, and various indicators are logically ORed to derive the state of a real indicator. Additionally, certain special rules govern the behavior of indicator lights in response to actions of the HMC, allowing the HMC to override indicator lights set by the user partitions. An indicator light management function within the dispatchable hypervisor maintains state information and responds to requests coming from the partitions or the HMC to alter or read indicator light state.

Figure 5A:
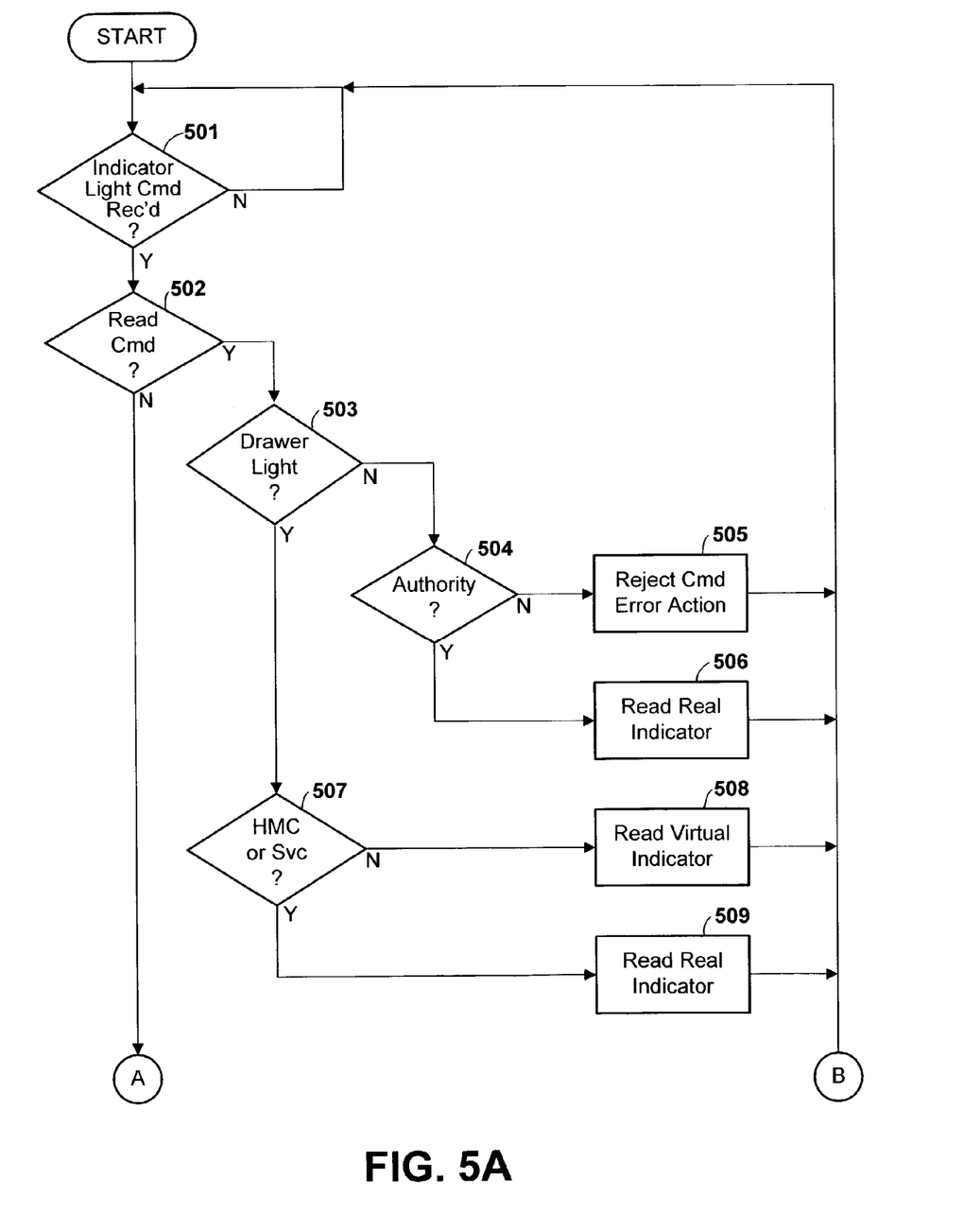
FIGS. 5A, 5B and 5C (herein referred to collectively as FIG. 5) are a high-level flow diagram showing the decision process of maintaining indicator lights, according to the preferred embodiment.
Figure 5B:
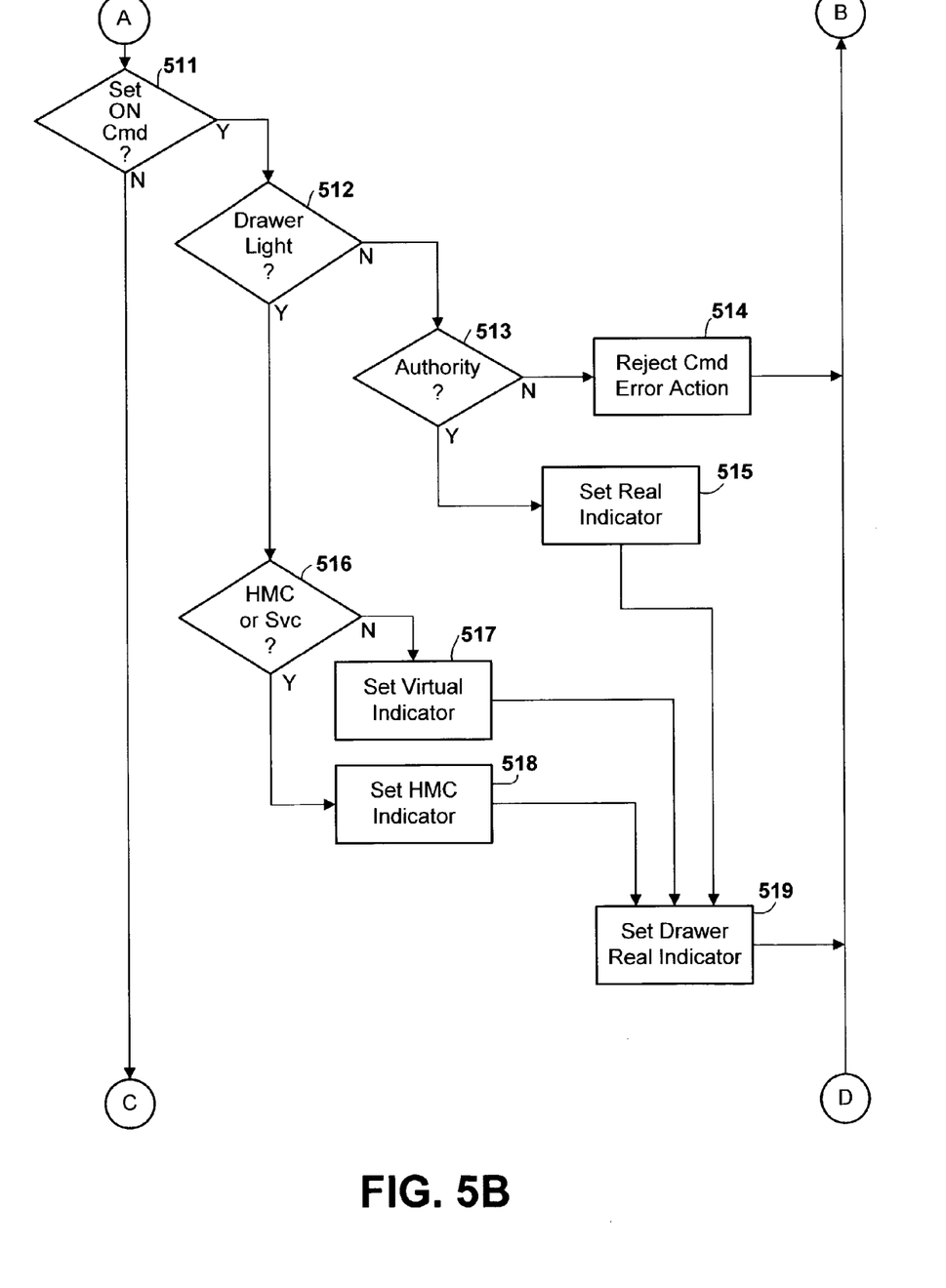
Figure 5C:
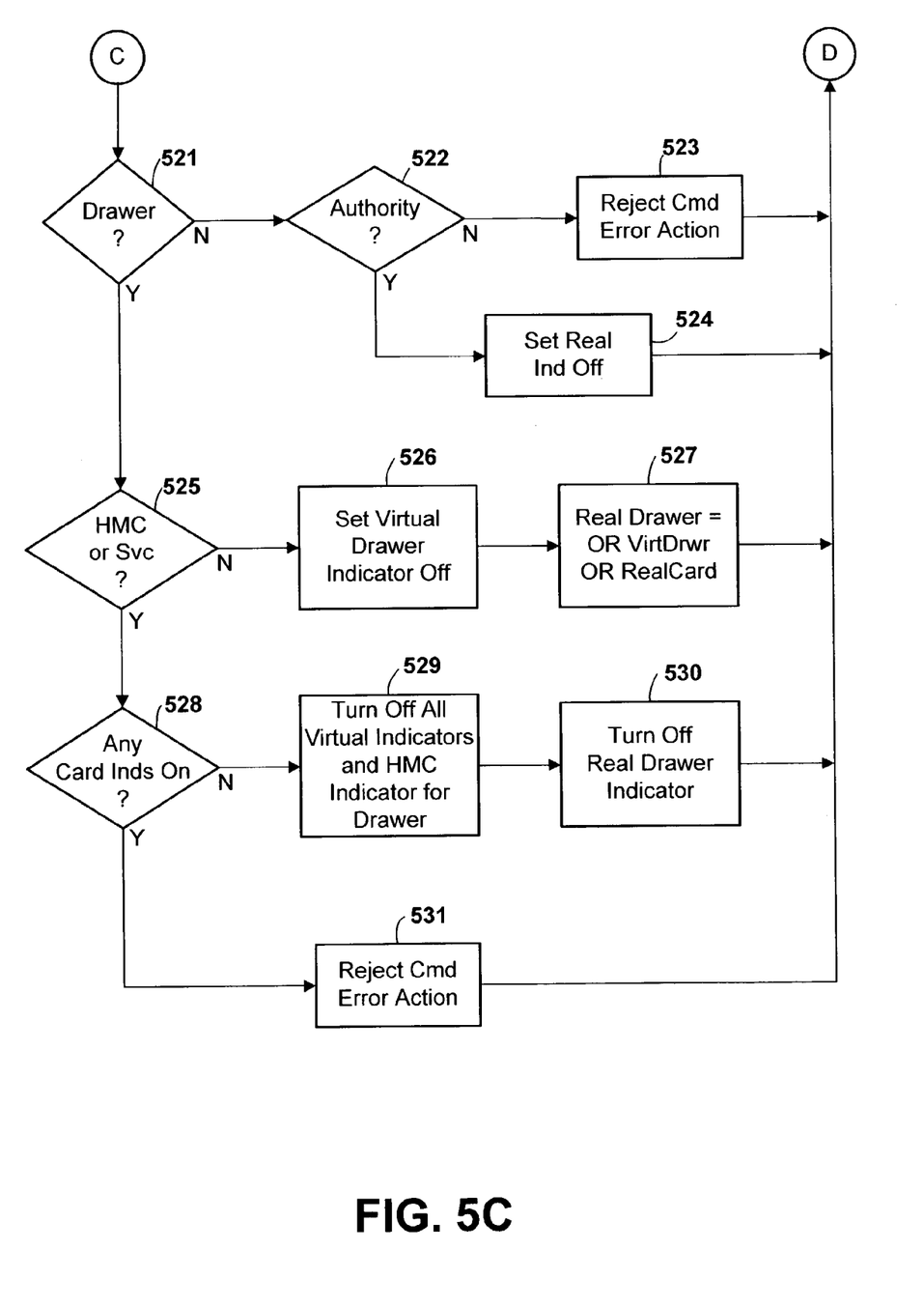

FIGS. 5A, 5B and 5C (herein referred to collectively as FIG. 5) are a high-level flow diagram showing the decision process of maintaining indicator lights performed by dispatchable hypervisor 303, according to the preferred embodiment. The indicator light management function is but one of many functions performed by dispatchable hypervisor 303. Indicator lights are set and read responsive to commands received from processes in other partitions such as user partitions or the service partition, or from the hardware management console 114. This is represented conceptually in FIG. 5 as the tight loop at step 501, in which the indicator light function waits until a relevant command (a command relating to indicator light function) is received, at which point the "Y" branch is taken from step 501. It will be understood that FIG. 5 is intended as a conceptual representation of the behavior of the indicator light function, and is not intended to represent actual code paths. In reality any of numerous triggering mechanisms may be used to initiate processing of an indicator light command when received, decisions may be taken in a different order than represented, and so forth.

If the received command is a read command (i.e., a command to read and report the state of an indicator light) the "Y" branch is taken from step 502 to step 503. In this case, the read command is either for reading a drawer indicator light or for reading the indicator light for some hardware device at a lower level in the hierarchy which is contained within a drawer (which for simplicity of description is herein referred to as a "card" indicator light, it being understood that the hardware device is not necessarily a card). If the read command is for a card indicator light, the "N" branch is taken from step 503 to step 504.

Only a privileged process (the HMC process or a process executing in the service partition), or a process executing in the partition to which the card is assigned, is authorized to read or set an indicator light for a card. In the preferred embodiment, indicator lights for cards which represent shared resources (such as memory or processor cards) can not be read or set by an unprivileged process. However, some cards are assigned to particular logical partitions, and in this case a process executing in the logical partition to which the card is assigned is authorized to read or set the indicator light. At step 504, the hypervisor verifies that the read command came from a process having authority to read the corresponding card indicator light. If not, the "N" branch is taken from step 504; the read command is rejected, and appropriate error action (such as generation of an error message) is taken (step 505). If the requesting process has authority to read the indicator light state, the "Y" branch is taken from step 504, and the hypervisor reports the state of the real indicator light for the requested card (step 506).

If, at step 503, the read command was for a drawer indicator light, the "Y" branch is taken from step 503 to step 507. If the requesting process was not the HMC process or a process executing in the service partition, the "N" branch is taken from step 507, and the hypervisor reports the state of the virtual drawer indicator light corresponding to the partition from which the command originated (step 508). Otherwise, the "Y" branch is taken from step 507, and the hypervisor reports the state of the real drawer indicator light (step 509).

If, at step 502, the command received was not a read command, the "N" branch is taken to step 511. In this case, if the command was a command to set an indicator light on, the "Y" branch is taken from step 511 to step 512. In this case, the set command is either for turning on a drawer indicator light or a card indicator light. If the set command is for a card indicator light, the "N" branch is taken from step 512 to step 513.

As in the case of reading indicator lights (explained above with respect to step 504), the hypervisor verifies that the requesting process has authority to set the indicator light for a card (step 513). If the requesting process lacks authority, the "N" branch is taken from step 513, the set command is rejected, and an appropriate error action is taken (step 514). If the requesting process has the requisite authority, the "Y" branch is taken from step 513, and the real indicator light for the card is set on (step 515), causing the physical light to be illuminated. The state of the real indicator light for the drawer in which the card is located should be illuminated as well to allow service personnel to locate the card. Accordingly, at step 519 the corresponding drawer real indicator light is set on, causing the physical light for the drawer to be illuminated.

If, at step 512, the set command was for a drawer indicator light, the "Y" branch is taken from step 512 to step 516. If the requesting process was not the HMC process or a process executing in the service partition, the "N" branch is taken from step 516, and the hypervisor sets to "on" the virtual drawer indicator light corresponding to the partition from which the command originated (step 517). Otherwise, the "Y" branch is taken from step 516, and the hypervisor sets to "on" the HMC indicator (step 518). In either case (step 517 or step 518), the real drawer indicator light is set on (step 519), causing the physical light for the drawer to be illuminated.

If, at step 511, the "N" branch was taken, then the command was neither a read command nor a command to set an indicator light on, leaving only a command to set an indicator light off. In this case, the set off command is either for turning off a drawer indicator light or a card indicator light. If the set command is for a card indicator light, the "N" branch is taken from step 521 to step 522.

As in the case of reading indicator lights (explained above with respect to step 504), the hypervisor verifies that the requesting process has authority to set the indicator light for a card (step 522). If the requesting process lacks authority, the "N" branch is taken from step 522, the set command is rejected, and an appropriate error action is taken (step 523). If the requesting process has the requisite authority, the "Y" branch is taken from step 522, and the real indicator light for the card is set off (step 524), causing the physical light to be turned off.

Turning off the real indicator light for a card might, but will not necessarily, affect the state of the real indicator light for the drawer in which the card is located. The real indicator for the drawer should be the logical OR of the real indicators of the component cards, as well as the logical OR of the virtual and HMC indicators for the drawer. Since turning off the real card indicator might have caused a change in state of the real drawer indicator, the real drawer indicator state is re-computed (at step 527) as the logical OR of the constituent state indicators, i.e.:

RealDrawer$_N$=OR (RealCard$_1$, RealCard$_2$ ...
P1VirtualDrawer$_N$, P2VirtualDrawer$_N$ ...,
HMCDrawer$_N$), where RealCard$_1$ is the real card indicator for card I in Drawer N, PJVirtualDrawer$_N$ is the Partition J virtual indicator for Drawer N, and HMCDrawer$_N$ is the HMC indicator for Drawer N. If re-computation of the real drawer indicator state at step 527 causes a change in state to off, the physical drawer indicator light will be turned off.

If, at step 521, the set command was for a drawer indicator light, the "Y" branch is taken from step 521 to step 525. If the requesting process was not the HMC process or a process executing in the service partition, the "N" branch is taken from step 525, and the hypervisor sets to "off" the virtual drawer indicator light corresponding to the partition from which the command originated (step 526). The hypervisor then re-computes the state of the real drawer indicator as described above (step 527).

If, at step 525, the "Y" branch is taken, the hypervisor determines whether any real card indicator lights within the drawer to which the request pertains are currently set "on" (step 528). If no card lights in the drawer are set on, the "N" branch is taken to step 529. In this case, the hypervisor turns off all virtual indicator lights for the requested drawer and turns off the HMC indicator for the drawer (step 529). Because all constituent indicators are now off, the hypervisor also turns off the real drawer indicator light (step 530), causing the physical indicator light for the drawer to be turned off. It will be noted that a privileged process (i.e., an HMC process or a process executing in the service partition) thus overrides any virtual drawer indicators which may have been set by processes executing in user partitions.

However, if at step 528, the "Y" branch is taken because a real card light is on, the command is rejected and an error action is taken (step 531). The reason for this is that turning off the real drawer indicator light would create a logical inconsistency, since a card light within the drawer would be left on. The hypervisor could, of course, override all the card lights and set them to "off" as well. A design decision was made in this case to reject the command, so that the HMC or service partition process can reconsider the situation. The HMC or service partition process has the authority to turn off all the card lights if that was the intention, but it is considered best that the hypervisor require the privileged process to do so explicitly.

Although not shown in the flow diagrams of FIG. 5, the rack and row indicator lights are set consistently with the settings of the real drawer indicator lights. A rack indicator light is simply the logical OR of all the real drawer indicator lights within the rack, and a row indicator light is the logical OR if all the rack indicator lights within the row. The rack and row indicator lights are automatically set responsive to the settings of the drawer lights, and can not be separately set or read.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as system memory 102 and data storage devices 122.

It will be recognized that considerable variation in the hierarchy of physical devices and indicator lights, and in the use of virtual indicators, could be employed consistent with the present invention. Lights could be assigned to different types of devices, and virtual indicators could be used for types of devices other than and/or in addition to drawers.

Although a specific embodiment of the invention has been disclosed along with certain alternatives, it will be recognized by those skilled in the art that additional variations in form and detail may be made within the scope of the following claims:

What is claimed is:

1. A method for managing hardware indicator lights in a computer system, comprising:
    defining a plurality of logical partitions of said computer system and resources allocated to each respective partition;
    establishing a respective set of multiple virtual indicator lights for each of one or more hardware indicator lights, each virtual indicator light in a set of multiple virtual indicator lights corresponding to a respective logical partition, each virtual indicator light having a state;
    setting the state of each respective virtual indicator light responsive to a corresponding request from a process executing within the logical partition to which the respective virtual indicator light corresponds; and
    determining the state of each hardware indicator light as a function of the states of the virtual indicator lights of the respective set of virtual indicator lights for the hardware indicator light;
    wherein said step of determining the state of each hardware indicator light as a function of the states of the virtual indicator lights comprises generating a logical OR function of the states of the virtual indicator lights of the respective set of virtual indicator lights for the hardware indicator light.

2. The method for managing hardware indicator lights in a computer system of claim 1, further comprising the step of setting the states of all virtual indicator lights for a specific hardware indicator light responsive to a request from a privileged process.

3. The method for managing hardware indicator lights in a computer system of claim 1, further comprising the step of:
    responsive to a request from a process executing within a first logical partition to report the state of a first hardware indicator light, reporting only the state of the virtual indicator light corresponding to the first logical partition in the set of virtual indicator lights for the first hardware indicator light, without reporting the state of the first hardware indicator light.

4. The method for managing hardware indicator lights in a computer system of claim 1, wherein said computer system contains a plurality of classes of hardware indicator lights, including:
- a first class of hardware indicator lights incorporated into respective hardware devices of a first class; and
- a second class of hardware indicator lights incorporated into respective hardware devices of a second class, wherein each said hardware device of a second class is designed to contain one or more said hardware devices of a first class.

5. The method for managing hardware indicator lights in a computer system of claim 4, wherein a respective set of virtual indicator lights is associated with each of a first plurality of hardware indicator lights of said second class.

6. The method for managing hardware indicator lights in a computer system of claim 5, wherein, for each hardware indicator light of said first plurality of hardware indicator lights incorporated into a specific hardware device of said second class, said step of determining the state of the hardware indicator light comprises generating a logical OR function of the states of the virtual indicator lights of the respective set of virtual indicator lights associated with the hardware indicator light and the states of all hardware indicator lights of said first class which are incorporated into hardware devices of said first class contained within the specific hardware device of said second class.

7. A computer program product for managing hardware indicator lights in a computer system, comprising:
- a plurality of executable instructions recorded on tangible signal-bearing media, wherein said instructions, when executed by at least one processor of a computer system, cause the computer system to perform the steps of:
  - establishing a respective set of multiple virtual indicator lights for each of one or more hardware indicator lights, each virtual indicator light in a set of multiple virtual indicator lights corresponding to a respective logical partition of a plurality of defined logical partitions of said computer system, each logical partition being allocated respective resources of said computer system, each virtual indicator light having a corresponding respective state;
  - setting the state of each respective virtual indicator light responsive to a corresponding request from a process executing within the logical partition to which the respective virtual indicator light corresponds; and
  - determining the state of each hardware indicator light as a function of the states of the virtual indicator lights of the respective set of virtual indicator lights for the hardware indicator light;
  - wherein said step of determining the state of each hardware indicator light as a function of the states of the virtual indicator lights comprises generating a logical OR function of the states of the virtual indicator lights of the respective set of virtual indicator lights for the hardware indicator light.

8. The computer program product for managing hardware indicator lights of claim 7, wherein said instruction further perform the step of setting the states of all virtual indicator lights for a specific hardware indicator light responsive to a request from a privileged process.

9. The computer program product for managing hardware indicator lights of claim 7, wherein said instructions further perform the step of:
- responsive to a request from a process executing within a first logical partition to report the state of a first hardware indicator light, reporting only the state of the virtual indicator light corresponding to the first logical partition in the set of virtual indicator lights for the first hardware indicator light, without reporting the state of the first hardware indicator light.

10. The computer program product for managing hardware indicator lights of claim 7, wherein said computer system contains a plurality of classes of hardware indicator lights, including:
- a first class of hardware indicator lights incorporated into respective hardware devices of a first class; and
- a second class of hardware indicator lights incorporated into respective hardware devices of a second class, wherein each said hardware device of a second class is designed to contain one or more said hardware devices of a first class.

11. The computer program product for managing hardware indicator lights of claim 10, wherein a respective set of virtual indicator lights is associated with each of a first plurality of hardware indicator lights of said second class.

12. The computer program product for managing hardware indicator lights of claim 11, wherein, for each hardware indicator light of said first plurality of hardware indicator lights incorporated into a specific hardware device of said second class, said step of determining the state of the hardware indicator light comprises generating a logical OR function of the states of the virtual indicator lights of the respective set of virtual indicator lights associated with the hardware indicator light and the states of all hardware indicator lights of said first class which are incorporated into hardware devices of said first class contained within the specific hardware device of said second class.

13. A computer system, comprising:
- at least one processor;
- a memory coupled to said at least one processor;
- a plurality of hardware indicator lights associated with respective hardware components of said computer system;
- a logical partitioning enforcement mechanism comprising instructions storable in said memory and executable on said at least one processor, said logical partitioning enforcement mechanism permitting access to computer system resources by a plurality of logical partitions according to respective logical partition definitions;
- wherein said logical partitioning enforcement mechanism maintains a respective set of multiple virtual indicator lights for each hardware indicator light of a first subset of said hardware indicator lights, each virtual indicator light in a set of multiple virtual indicator lights corresponding to a respective logical partition, each virtual indicator light having a corresponding respective state;
- wherein said logical partitioning enforcement mechanism sets the state of each respective virtual indicator light responsive to a corresponding request from a process executing within the logical partition to which the respective virtual indicator light corresponds; and
- wherein said logical partitioning enforcement mechanism determines the state of each hardware indicator light of said first subset as a function of a logical OR of the states of the virtual indicator lights of the respective set of virtual indicator lights for the hardware indicator light.

14. The computer system of claim 13, further comprising a hardware management console providing an interface to said logical partitioning enforcement mechanism.

15. The computer system of claim 13, wherein said logical partitioning enforcement mechanism hides the state of a first hardware indicator light from processes executing within a first logical partition, and makes available to said processes only the state of the virtual indicator light corresponding to the first logical partition in the set of virtual indicator lights for the first hardware indicator light.

16. The computer system of claim 13, wherein said computer system contains a plurality of classes of hardware indicator lights, including:
- a first class of hardware indicator lights incorporated into respective hardware devices of a first class; and
- a second class of hardware indicator lights incorporated into respective hardware devices of a second class, wherein each said hardware device of a second class is designed to contain one or more said hardware devices of a first class.

17. The computer system of claim 16, wherein a respective set of virtual indicator lights is associated with each of a first plurality of hardware indicator lights of said second class, and wherein for each hardware indicator light of said first plurality of hardware indicator lights incorporated into a specific hardware device of said second class, said logical partitioning enforcement mechanism determines the state of the hardware indicator light by generating a logical OR function of the states of the virtual indicator lights of the respective set of virtual indicator lights associated with the hardware indicator light and the states of all hardware indicator lights of said first class which are incorporated into hardware devices of said first class contained within the specific hardware device of said second class.

* * * * *